US010384328B2

(12) United States Patent
Maeda et al.

(10) Patent No.: US 10,384,328 B2
(45) Date of Patent: Aug. 20, 2019

(54) POLISHING DEVICE AND POLISHING METHOD (71) Applicant: SINTOKOGIO, LTD., Nagoya-shi, Aichi (JP)

(72) Inventors: Kazuyoshi Maeda, Ama-gun (JP); Norihito Shibuya, Ama-gun (JP)

(73) Assignee: SINTOKOGIO, LTD., Nagoya-shi, Aichi (JP)

(*) Notice: Subject to any disclaimer, the term of this patent is extended or adjusted under 35 U.S.C. 154(b) by 41 days.

(21) Appl. No.: 15/528,548

(22) PCT Filed: Oct. 29, 2015

(86) PCT No.: PCT/JP2015/080600
§ 371 (c)(1),
(2) Date: May 22, 2017

(87) PCT Pub. No.: WO2016/092976
PCT Pub. Date: Jun. 16, 2016

(65) Prior Publication Data
US 2017/0259401 A1 Sep. 14, 2017

(30) Foreign Application Priority Data

Dec. 8, 2014 (JP) .................. 2014-247522
Apr. 29, 2015 (JP) .................. 2015-092455

(51) Int. Cl.
B24C 1/08 (2006.01)
B24C 3/20 (2006.01)
(Continued)

(52) U.S. Cl.
CPC ............. B24C 9/003 (2013.01); B24C 1/08 (2013.01); B24C 3/20 (2013.01); B24C 3/26 (2013.01);
(Continued)

(58) Field of Classification Search
CPC .... B24C 1/00; B24C 1/04; B24C 1/06; B24C 1/08; B24C 3/20; B24C 3/22;
(Continued)

(56) References Cited

U.S. PATENT DOCUMENTS 937,180 A * 10/1909 Straub .................. B21B 1/22
198/523
3,232,419 A 2/1966 Rasmussen
(Continued)

FOREIGN PATENT DOCUMENTS

CN 202114634 U 1/2012
CN 102548712 A * 7/2012 ............. B24C 1/08
(Continued)

OTHER PUBLICATIONS

Translation of JP-H07-100767, Espacenet (Year: 2018).*
(Continued)

Primary Examiner — Joseph J Hail
Assistant Examiner — Timothy Brian Brady
(74) Attorney, Agent, or Firm — Drinker Biddle & Reath LLP (57) ABSTRACT A polishing method includes: a step of preparing a polishing device including a processing member and a suction mechanism configured to generate suction force; a step of setting a workpiece in the processing member; and a step of accelerating abrasive grains fed toward the workpiece to a predetermined speed with an air flow generated by operation of the suction mechanism, and polishing the workpiece by causing the abrasive grains to contact with or collide with the workpiece.

19 Claims, 5 Drawing Sheets (51) Int. Cl.
*B24C 3/26* (2006.01)
*B24C 3/32* (2006.01)
*B24C 5/00* (2006.01)
*B24C 9/00* (2006.01)

(52) U.S. Cl.
CPC ............. *B24C 3/32* (2013.01); *B24C 5/00* (2013.01); *B24C 9/00* (2013.01)

(58) Field of Classification Search
CPC .. B24C 3/065; B24C 5/00; B24C 5/08; B24C 7/0046; B24C 9/003; B24B 31/02; B24B 31/16; B65G 33/00; B65G 39/06; B65G 53/48
USPC .......... 451/32, 38, 84, 87, 89, 326, 327, 456
See application file for complete search history.

(56) References Cited

U.S. PATENT DOCUMENTS

| | | | |
|---|---|---|---|
| 3,286,406 A | 11/1966 | Ashworth | |
| 4,067,240 A * | 1/1978 | Straub | B24C 1/10 29/898.069 |
| 4,300,318 A * | 11/1981 | Brown | B24C 3/02 451/38 |
| 4,432,220 A * | 2/1984 | Loersch | B24C 1/00 72/53 |
| 4,735,883 A * | 4/1988 | Honda | B24C 1/06 430/69 |
| 4,741,130 A * | 5/1988 | Tano | B24C 3/22 451/38 |
| 4,848,122 A * | 7/1989 | Sullivan | B24B 31/02 72/53 |
| 5,924,913 A | 7/1999 | Reimelt | |
| 6,390,898 B1 | 5/2002 | Pieper | |
| 6,394,881 B1 * | 5/2002 | Watanabe | B24C 1/083 451/38 |
| 2004/0053561 A1 | 3/2004 | Pieper | |
| 2013/0012103 A1 * | 1/2013 | Daffner | B24C 9/00 451/38 |

FOREIGN PATENT DOCUMENTS

| | | | |
|---|---|---|---|
| CN | 102548712 A | 7/2012 | |
| CN | 105451939 A | 3/2016 | |
| DE | 4344947 A1 | 8/1995 | |
| JP | S62-034778 A | 2/1987 | |
| JP | 07100767 A * | 4/1995 | ............... B24C 1/08 |
| JP | H07-100767 * | 4/1995 | ............... B24C 3/18 |
| JP | H07-100767 A | 4/1995 | |
| JP | 3031304 U | 11/1996 | |
| JP | H09-103960 A | 4/1997 | |
| JP | H09-323263 A | 12/1997 | |
| JP | H10-151566 A | 6/1998 | |
| JP | 2000-334661 A | 12/2000 | |
| JP | 2002-326043 A | 11/2002 | |
| JP | 2006-123151 | 5/2006 | |
| JP | 2008-194792 A | 8/2008 | |
| JP | 2013-180365 A | 9/2013 | |
| TW | 245154 | 4/1995 | |
| WO | WO 2017/059935 A1 | 4/2017 | |

OTHER PUBLICATIONS

Translation of CN 102548712, Espacenet (Year: 2018).*
JP-07100767—A translation Espacenet (Year: 2018).*
CN-102548712—A translation Espacenet (Year: 2018).*
International Preliminary Report on Patentability dated Jun. 22, 2017 for PCT/JP2015/080600.

* cited by examiner

POLISHING DEVICE AND POLISHING METHOD

TECHNICAL FIELD

The present disclosure relates to a polishing device and a polishing method for polishing a workpiece with collision or contact of abrasive grains.

BACKGROUND ART

As a method of polishing a workpiece, there is widely used blasting processing of injecting abrasive grains along with compressed air as a gas-solid two-phase flow from a nozzle toward the workpiece, causing the abrasive grains to collide with or contact with the workpiece, and thereby, polishing the workpiece. A generally used blasting processing device includes a recovery part formed into a funnel shape. The recovery part is provided in a lower part of a blasting chamber for performing the blasting processing on the workpiece. This blasting processing device sucks and recovers powder dust (injected blasting abrasives and cutting powder of the workpiece) having fallen in the recovery part, sorts it into reusable blasting abrasives and other fine particles (abrasive grain in which cracks or defects arise and the cutting powder of the workpiece) with a classification device, and after that, performs the blasting processing again with the reusable blasting abrasives (for example, Patent Literature 1). In such a blasting processing device, since the abrasive grains scatter in the whole large-capacity blasting processing chamber, it is difficult to completely prevent powder dust from scattering outside the blasting processing chamber in exchanging workpieces or the similar situation. Moreover, since high suction performance is required for equipment that generates suction force, there is a problem that the whole blasting processing device increases in size.

To efficiently recover the powder dust, there is disclosed a blasting processing device having a configuration of including a cover joined to suction equipment in the vicinity of the nozzle outlet, preventing powder dust from scattering with the cover, and recovering powder dust staying in the cover with the suction equipment (for example, Patent Literature 2). Since such a blasting processing device can be applied only when the processed surface is a sufficiently large flat surface with respect to the nozzle, the blasting processing device that has this configuration cannot be used depending on the shape of the workpiece.

In blasting processing, the injection pressure of a gas-solid two-phase flow is typically 0.2 MPa or more to be high. Therefore, there are a problem that the workpiece itself is blown off with the gas-solid two-phase flow and a problem that the abrasive grains stick into the workpiece, depending on the shape or the dimension of the workpiece.

CITATION LIST

Patent Literature

Patent Literature 1: Japanese Unexamined Patent Publication No. H09-323263

Patent Literature 2: Japanese Utility Model Registration No. 3031304

SUMMARY OF INVENTION

Technical Problem

The blasting processing has the aforementioned problems. In this technical field, a novel polishing device and polishing method are desired to replace the blasting processing.

Solution to Problem

According to an aspect of the present invention, there is provided a polishing method for polishing a workpiece with abrasive grains. This polishing method includes the steps of the following items (1) to (3).

(1) A step of preparing a polishing device including a processing member and a suction mechanism configured to generate suction force.

(2) A step of setting a workpiece in the processing member.

(3) A step of accelerating abrasive grains fed toward the workpiece to a predetermined speed with an air flow generated by operation of the suction mechanism, and polishing the workpiece by causing the abrasive grains to contact with or collide with the workpiece.

According to the polishing method according to an aspect, the abrasive grains fed toward the workpiece are accelerated to the predetermined speed with the air flow generated by the suction mechanism. With this acceleration, since the abrasive grains can obtain kinetic energy suitable for polishing the workpiece, the workpiece is polished when the abrasive grains contact with or collide with the workpiece. Notably, "feed of the abrasive grains" stated here means to simply feed the abrasive grains toward the workpiece without an initial speed, or to feed the abrasive grains toward the workpiece with an exceedingly low initial speed, and is different from injecting or projecting the abrasive grains toward the processed article as in the blasting processing device. For example, the abrasive grains may be fed toward the workpiece by allowing the abrasive grains free fall, or the abrasive grains may be fed toward the workpiece at a weak air capacity to an extent of no scattering to the periphery or no influence on polishing.

In the polishing method of an embodiment, the processing member may include a placing board having a first face and a second face as a reverse face to the first face. In the placing board, a plurality of through holes penetrating the placing board in a direction from the first face toward the second face may be provided. Each of the plurality of through holes may have a dimension such that each of the abrasive grains is capable of passing through and the workpiece is incapable of passing through. Further, in the step of setting the workpiece in the processing member, the workpiece may be placed on the first face. In this case, the workpiece can be set in the processing member without impairing polishing performance.

In the polishing method of an embodiment, the suction mechanism may be disposed on the second face side. Further, the air flow may be an air flow from the first face toward the second face. With this configuration, since the air flow from the first face side toward the second face side arises in the vicinity of the workpiece, the workpiece can be favorably polished with this air flow.

The polishing method of an embodiment may further include a step of recovering the abrasive grains. In the step of polishing the workpiece, the abrasive grains may be fed from the first face side toward the workpiece. In the step of recovering, the abrasive grains having reached the second face may be sucked and recovered by the suction mechanism. Since the abrasive grains and fine particles (the abrasive grains and the fine particles are hereinafter collectively noted as "powder dust") travel toward the suction mechanism, the powder dust can be suppressed from scattering outside of the polishing region. The fine particles include abrasive grains in which cracks or defects arise and cutting powder arising through polishing.

The polishing method of an embodiment may further include a step of straightening the air flow by the suction mechanism. In the step of straightening, by straightening the air flow, a mode of the abrasive grains contacting with or colliding with the workpiece may be controlled. With the step of straightening, the action of the abrasive grains with respect to the workpiece can be controlled to change the mode of polishing. In this way, the mode of polishing to meet the purpose of processing can be set.

In the polishing method of an embodiment, the processing member may further include a frame body provided at an outer edge part of the placing board. In this case, even when excess abrasive grains are temporarily fed, the abrasive grains are prevented from falling outside the processing member. Moreover, even when a plurality of workpieces are placed on the processing member, the abrasive grains are prevented from falling outside the processing member.

The polishing method of an embodiment may further include a step of stirring a plurality of workpieces by setting the plurality of workpieces in a fluidized state. In the step of setting the workpiece, the plurality of workpieces may be placed on the first face. In the step of polishing the workpiece, the plurality of workpieces may be polished by causing the abrasive grains to contact with or collide with the plurality of workpieces in the fluidized state. Since the abrasive grains contact with or collide with the plurality of workpieces in the state where the plurality of workpieces are being stirred, the plurality of workpieces can be polished with uniformity.

In the polishing method of an embodiment, in the step of stirring the plurality of workpieces, the plurality of workpieces may be stirred by disposing the processing member with an inclination at a predetermined angle and rotating the processing member. In this case, while workpieces rotate along the frame body, following the rotation of the processing member with centrifugal force, they fall departing from the frame body when the gravity becomes larger than the centrifugal force. Thus, the plurality of workpieces can be stirred and uniformly dispersed. Moreover, in an embodiment, the angle at which the processing member is inclined and disposed may be 30 to 70°. Moreover, in an embodiment, the rotational speed of the processing member may be 5 to 50% of critical rotational speed.

In the polishing method of an embodiment, the Vickers hardness of the workpiece may be 3 to 200 Hv, and the speed of the abrasive grains in the occasion when the abrasive grains contact with or collide with the workpiece may be 5 to 30 msec. In this way, by adjusting the speed of the abrasive grains, the workpiece relatively low in hardness can also be favorably polished. Moreover, by accelerating the abrasive grains to this speed, the workpiece can be favorably polished while the abrasive grains are suppressed from sticking into the workpiece. Moreover, in view of an embodiment, a ratio of the abrasive grains occupying a space of the abrasive grains contributing to polishing on the workpiece may be 3 to 20 vol %.

The polishing method of an embodiment may further include a step of feeding the abrasive grains toward the workpiece. The polishing device may further include an abrasive grain feed mechanism configured to feed the abrasive grains toward the workpiece. In the step of feeding the abrasive grains, the abrasive grains may be fed toward the workpiece by the abrasive grain feed mechanism through free fall. In this case, since the abrasive grains are not needed to be given an initial speed, a possibility of the abrasive grains scattering outside the polishing region can be reduced.

According to another aspect of the present invention, there is provided a polishing device for polishing a workpiece. This polishing device includes a processing member for placing the workpiece, an abrasive grain feed mechanism configured to feed abrasive grains toward the workpiece placed on the processing member, and a suction mechanism configured to generate an air flow in a direction from the abrasive grain feed mechanism toward the processing member with suction force. The suction mechanism accelerates the abrasive grains fed toward the workpiece by the abrasive grain feed mechanism to a predetermined speed with the air flow, and polishes the workpiece by causing the accelerated abrasive grains to contact with or collide with the workpiece.

According to the polishing device according to another aspect, the abrasive grains fed toward the workpiece are accelerated to the predetermined speed with the air flow generated by the suction mechanism. With this acceleration, since the abrasive grains can obtain kinetic energy suitable for polishing the workpiece, the workpiece is polished when the abrasive grains contact with or collide with the workpiece.

Advantageous Effects of Invention

With the various aspects and the embodiments of the present invention, a workpiece can be polished without causing the problems in blasting processing as mentioned above.

DESCRIPTION OF EMBODIMENTS

Examples of a polishing device and a polishing method of the present invention are described with reference to the drawings. In the following description, the upward, downward, rightward and leftward directions indicate the directions in the drawings unless otherwise noted. Notably, the present invention is not limited to the configurations of the present embodiments but can be properly modified as needed.

Figure 1:
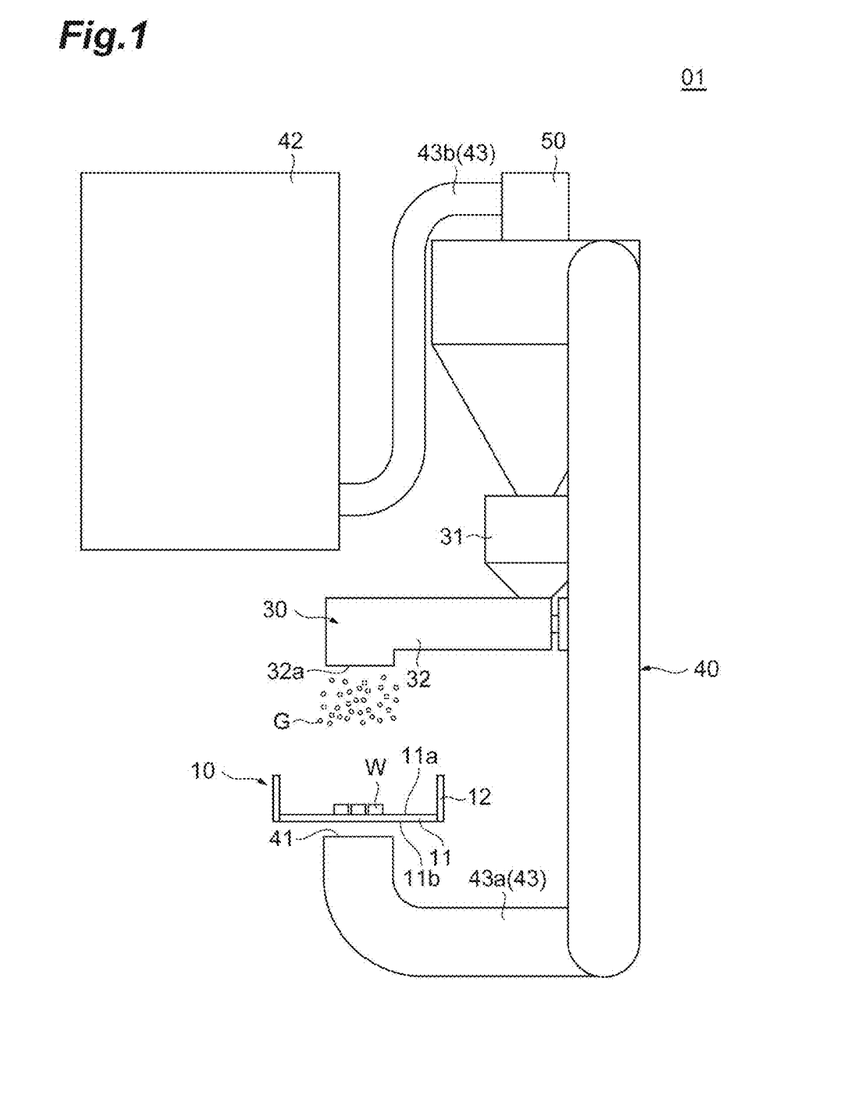
FIG. 1 is a schematic diagram for explaining a polishing device used in a first embodiment of the present invention.

As shown in FIG. 1, a polishing device 01 used in a first embodiment includes a processing member 10, an abrasive grain feed mechanism 30, a suction mechanism 40 and a sorting mechanism 50.

The processing member 10 is a member for containing a workpiece W. The processing member 10 includes a placing board 11. The placing board 11 has a first face 11a (placement face) which is a face on which the workpiece W is placed, and a second face 11b which is a reverse face to the first face. The placing board 11 has a plurality of opening parts which do not cause the workpiece W to pass through but can cause abrasive grains to pass through. Specifically, in the placing board 11, a plurality of through holes which penetrate the placing board 11 in the direction from the first face 11a toward the second face 11b are provided. Each of the plurality of through holes has a dimension such that each of abrasive grains G is capable of passing through and the workpiece W is incapable of passing through. The placing board 11 may be, for example, a board configured to be mesh-like, a perforated metal, or a board in which a plurality of slits are provided.

The shape of the placing board 11 is not specially limited. Moreover, the processing member 10 may further include a frame body provided at an outer edge part of the placing board 11. By the processing member 10 including the frame body, the workpiece W does not fall outside from the outer edge part of the processing member 10.

The processing member 10 of the present embodiment includes the placing board 11 in a disc shape configured to be mesh-like, and a frame body 12 fixed to the outer edge part of the placing board 11. The frame body 12 surrounds the peripheral edge of the placing board 11 at least on the first face 11a of the placing board 11. Namely, the processing member 10 of the present embodiment has a cylindrical shape in which an upper part above the placing board 11 (first face 11a side) is open.

The abrasive grain feed mechanism 30 is a mechanism for feeding the abrasive grains G toward the workpiece W. The abrasive grain feed mechanism 30 includes a reservoir tank 31 and a carrying-out part 32. The reservoir tank 31 is a tank for storing the abrasive grains G. In the carrying-out part 32, a discharge port 32a is provided. The carrying-out part 32 is disposed in such a way that the discharge port 32a is positioned above the first face 11a of the placing board 11. The carrying-out part 32 may be configured so as to be able to discharge the abrasive grains G in the reservoir tank 31 (hopper) through the discharge port 32a by a fixed amount. The carrying-out part 32 may be configured, for example, to include a carrying screw and a trough enclosing the carrying screw, and to put the abrasive grains G in the reservoir tank 31 forward to the discharge port 32a provided at the trough. Moreover, the carrying-out part 32 may include a disc-shaped bottom board and a scraper horizontally rotating with the center of the bottom board being as an axial center. In this case, the carrying-out part 32 may be configured to deposit a predetermined amount of abrasive grains G on the bottom board at an angle of repose by disposing the bottom face of the reservoir tank 31 slightly separated from the bottom board, and to scrape this out by the scraper toward the discharge port 32a. As the carrying-out part 32, another known configuration may be used. In the present embodiment, the carrying-out part 32 includes the former configuration.

The suction mechanism 40 includes both a function of accelerating the abrasive grains G and a function of sucking the same. The suction mechanism 40 includes a hose 43 and a dust collector 42. One end face of the hose 43 (in the present embodiment, a suction part 41) is provided below the second face 11b of the placing board 11 and is separated from the second face 11b. The dust collector 42 is joined to the hose 43.

The sorting mechanism 50 is a mechanism that sorts out a reusable abrasive grains from powder dust. Moreover, the sorting mechanism 50 is disposed in the middle of the path from the suction part 41 toward the dust collector 42. Namely, a first hose 43a whose one end face forms the suction part 41 is joined to the sorting mechanism 50, and the sorting mechanism 50 is joined to the dust collector 42 with a second hose 43b. As mentioned later, the sorting mechanism 50 is a mechanism that separates powder dust into the reusable abrasive grains and other fine particles (abrasive grains in which cracks or defects arise and cutting powder, of the workpiece, which arises through polishing). The sorting mechanism 50 may be configured to perform classification using a difference in specific gravity of the powder dust and an air flow. As the sorting mechanism 50, for example, a cyclone separator, a centrifugal classifier, or another known configuration may be used. In the present embodiment, as the sorting mechanism 50, a cyclone separator is used, and the bottom part of the cyclone separator is joined to the reservoir tank 31.

Figure 2:
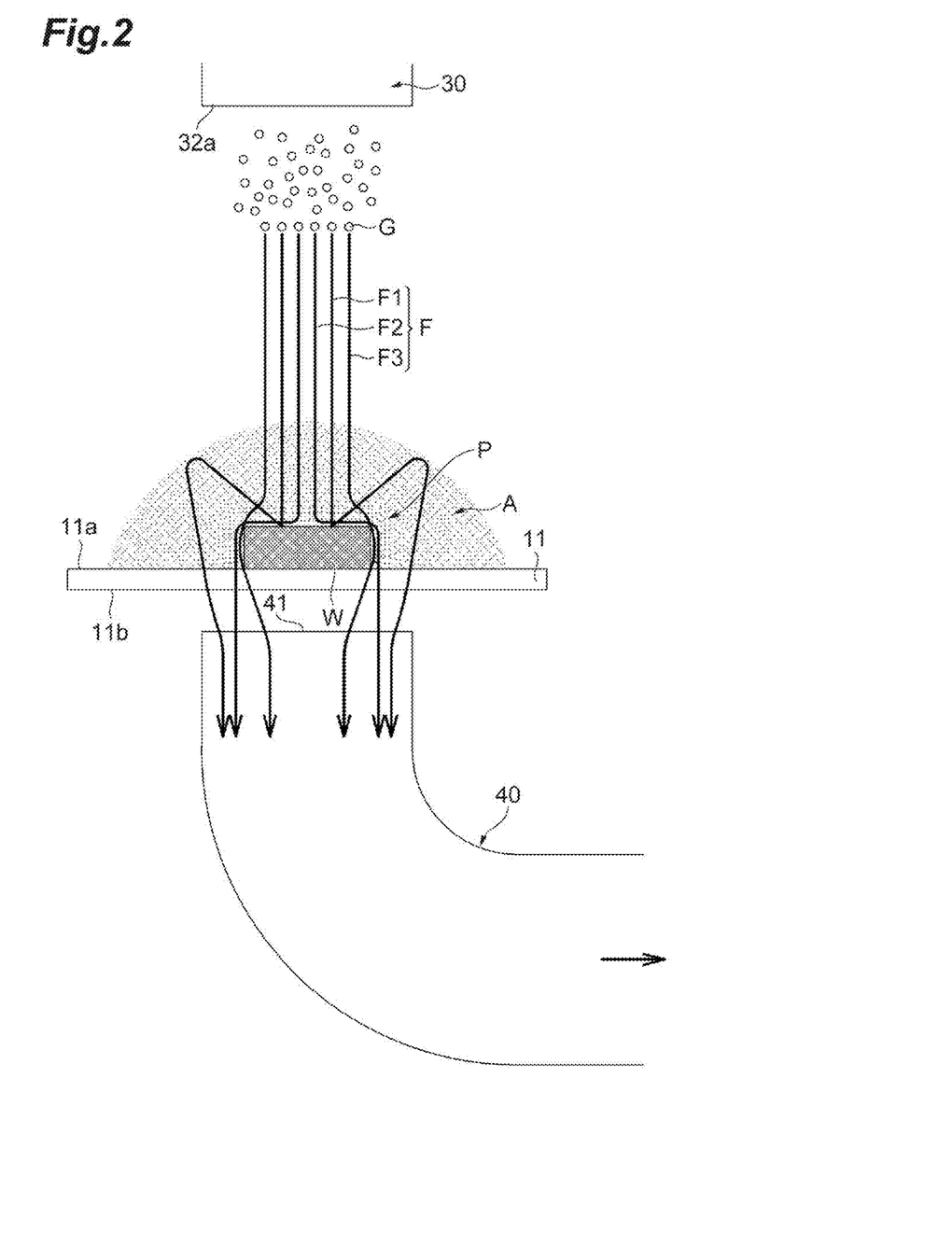
FIG. 2 is a schematic diagram for explaining a mechanism of polishing in the first embodiment.
Figure 3:
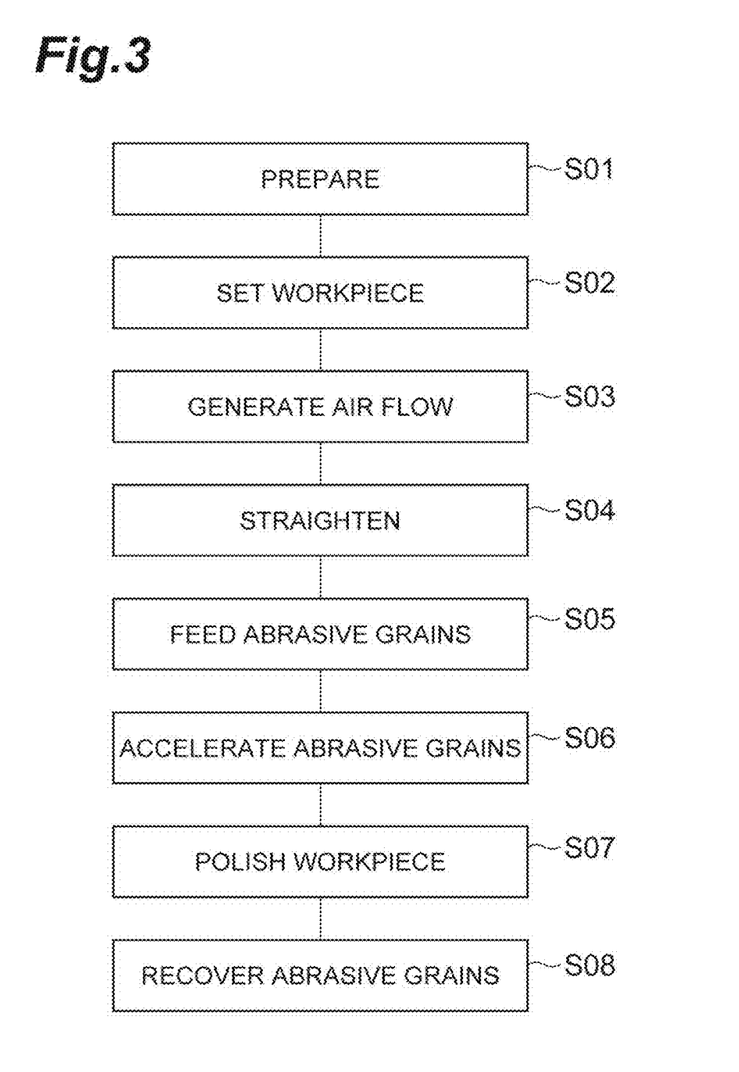
FIG. 3 is a flowchart showing the steps of polishing in the first embodiment.

Next, a polishing method is described further using FIG. 2 and FIG. 3.

(S01: Preparing Step)

The polishing device 01 is prepared. The abrasive grains G are beforehand loaded in the reservoir tank 31 shown in FIG. 1. The material of the abrasive grains G used in the present embodiment can be properly selected depending on the material and the shape of a processed article and the purpose of processing the same. For example, the abrasive grains G can be selected from metallic or nonmetallic particles (shot, grid and cut wire), ceramic particles ($Al_2O_3$, SiC, $ZrO_2$ and the like), natural stone particles (emery, silica stone, diamond and the like), plant particles (walnut shells, peach seeds, apricot seeds and the like), and resin particles (nylon, melamine, urea and the like).

Moreover, the particle diameter of the abrasive grains G can also be properly selected depending on the material and the shape of the processed article and the purpose of processing the same. It should be noted that the particle diameter of the abrasive grains G must be selected such that it is a diameter to be capable of passing through the opening parts (through holes) of the processing member 10. For example, in the case of setting ceramic particles as the abrasive grains G, the particle diameter of the abrasive grains G is selected such that the particle size defined by JIS (Japanese Industrial Standards) R6001; 1998 is F220, or #240 or more and #1000 or less, and it is a diameter to be capable of passing through the opening parts (through holes) of the processing member 10.

(S02: Step of Setting Workpiece in Processing Member)

By placing the workpiece W on the first face 11a of the placing board 11, the workpiece W is contained (set) in the processing member 10. While in FIG. 2, one workpiece W is presented for convenience, a plurality of workpieces W can also be placed on the processing member 10 to be polished.

(S03: Step of Generating Air Flow)

When operating the dust collector 42, an air flow from the first face 11a toward the second face 11b in the vicinity of the placing board 11 is generated.

(S04: Step of Straightening)

By straightening the flow of the air flow, the mode of the abrasive grains G colliding with or contacting with the workpiece W can be intentionally changed (controlled). This step can be performed, for example, by changing the position and the dimension of the suction part 41, the suction air capacity of the dust collector 42, and the like. Moreover, as mentioned later, since the speed of the abrasive grains G in the occasion when the abrasive grains G collide with or contact with the workpiece W is exceedingly low, the mode of the abrasive grains G colliding with or contacting with the workpiece W can be easily changed by the straightening step. Notably, the straightening step S04 may be omitted.

(S05: Step of Feeding Abrasive Grains)

When operating the abrasive grain feed mechanism 30, the abrasive grains G loaded in the reservoir tank 31 are discharged through the discharge port 32a by a fixed amount, and are fed (fall in the case of the present embodiment) toward the workpiece W. The speed of the abrasive grains G in the direction toward the workpiece W in the occasion when the abrasive grains G are discharged through the discharge port 32a is 0 m/sec or an exceedingly low speed, and the workpiece W is not polished even if the abrasive grains G collide with or contact with the workpiece W through free fall.

(S06: Step of Accelerating Abrasive Grains)

The abrasive grains G discharged through the discharge port 32a reach, by the air flow generated in the aforementioned step S03, an acceleration region A (region in which this air flow arises on the first face 11a side) through free fall. The abrasive grains G having reached the acceleration region A are accelerated toward the suction part 41 in such a way that the speed in the occasion of colliding with or contacting with the workpiece W is a predetermined speed. This predetermined speed may be a speed at which the workpiece W can be favorably polished and neither damage on nor sticking of the abrasive grains G into the workpiece W arise. For example, when the Vickers hardness (defined by HS Z2244; 2009) of the workpiece W is 3 to 200 Hv (testing force is 0.2 N), this predetermined speed may be 5 to 30 m/sec or may be 10 to 20 m/sec. In blasting processing which is a conventional polishing method, since the injection pressure is 0.2 MPa or more to be high, such a speed cannot be realized. If this speed is tried to be realized by injecting the abrasive grains at an exceedingly low injection pressure, since the injection amount of the blasting abrasives from the nozzle is not stable, unevenness in the degree of finishing of the workpiece arises. By the polishing method of the present embodiment, since the speed of the abrasive grains G in the occasion when the abrasive grains G collide with or contact with the workpiece W can be set to be an exceedingly low speed, the workpiece W can be polished with the abrasive grains G at the exceedingly low speed. Adjustment of this speed can be performed by adjustment of suction air capacity with the dust collector 42, change of the dimension and the shape of the suction part 41, and the like. The adjustment of the suction air capacity with the dust collector 42 can be performed, for example, by change of the rotational speed of a motor built in the dust collector 42, adjustment of the degree of opening of a dumper, the dumper for sucking the outside air being provided in the hose 43, or the like.

(S07: Step of Polishing Workpiece)

The abrasive grains G having reached the acceleration region A are being accelerated and travelling toward the suction part 41, and reach the processed surface of the workpiece W. After that, the abrasive grains G collide with or contact with the workpiece W to polish the processed surface, and after that, further travel toward the suction part 41. Actions F shown in FIG. 2 indicate the actions of the abrasive grains G. Examples of modes of the abrasive grains G colliding with or contacting with the workpiece W are described as actions F1, F2 and F3.

Action F1: After colliding with the upper face of the workpiece W, the abrasive grains G bounce. The processed surface is polished with impact force in the occasion when the abrasive grains G collide with the workpiece W.

Action F2: After colliding with the upper face of the workpiece W, the abrasive grains G travel along the upper face. The processed surface is polished with the impact force in the occasion when the abrasive grains G collide with the workpiece W and friction force in the occasion when the abrasive grains G travel along the upper face.

Action. F3: The abrasive grains G travel in such a way as to go along the dihedral angle portion of the workpiece W. Polishing is performed with at least any of the impact force in the occasion when the abrasive grains G collide with the dihedral angle portion of the workpiece W and friction force in the occasion when it passes on the dihedral angle portion. Therefore, rounding processing (corner rounding processing) and deburring of the dihedral angle portion can be performed.

Moreover, in a polishing region P which is a region in the vicinity of the workpiece W, that is, a region in which the abrasive grains G contribute to polishing (for example, a region within 1 mm from the faces of the workpiece W), a ratio of the abrasive grains G relative to the space may be 3 to 20 vol %. When the ratio of the abrasive grains G relative to the space is too small, since the occasion of the abrasive grains G contacting with the workpiece W is small, time until the polishing has completed increases. When the ratio of the abrasive grains G relative to the space is too large, since the abrasive grains G cannot collide with or contact with the workpiece W in the state where it is dispersed in the polishing region P, polishing efficiency is poor.

In the present embodiment, the workpiece W can be favorably polished even when the workpiece W is a resin. For example, the workpiece W can be favorably polished even when a resin having a hardness in which a Rockwell hardness based on the M-scaling defined by HS K7202; 2001 is within a range of 10 to 100 is set as the workpiece W.

(S08: Step of Recovering Abrasive Grains)

The abrasive grains G having collided with or contact with the workpiece W pass through the placing board 11 and move onto the second face lib side. The abrasive grains G having moved onto the second face 11b side are sucked from the suction part 41 by the dust collector 42. In this stage, the aforementioned fine particles also pass through the placing board 11 and are sucked from the suction part 41. Powder dust of the abrasive grains G and the fine particles passes through the first hose 43a and is transferred to the sorting mechanism 50. When the sorting mechanism 50 is a cyclone separator, the powder dust introduced from the upper part of the cyclone separator in such a way as to go along the wall surface spirally falls. In this process, the fine particles which are particles light in mass float upward, pass through the second hose 43b connected to the ceiling part of the cyclone separator, and are collected in the dust collector 42. Meanwhile, the abrasive grains G which are reusable and particle heavy in mass move toward the bottom part of the sorting mechanism 50, and are stored in the reservoir tank 31 joined to the bottom part of the sorting mechanism 50. These abrasive grains G are fed again toward the workpiece W through the discharge port 32a.

As described above, the abrasive grains G which are fed through the discharge port 32a in the abrasive grain feed mechanism 30 disposed on the first face 11a side and are accelerated to the predetermined speed with the suction force generated by the dust collector 42 collide with or contact with the workpiece W, and thereby, the workpiece W is polished. The abrasive grains G after colliding with or contacting with the workpiece W are sucked into the suction part 41 disposed on the second face 11b side. In this way, the abrasive grains G do not scatter around as in blasting processing which is a conventional polishing method. Moreover, since the speed of the abrasive grains G in the occasion when the abrasive grains G collide with or contact with the workpiece W can be set to be exceedingly slow, even in the case of polishing the workpiece W that is relatively low in hardness, the workpiece W can be favorably polished without damaging the workpiece W.

While in the present embodiment, polishing is performed with the position of the workpiece W fixed with respect to the flow channel of the abrasive grains G from the discharge port 32a to the suction part 41, polishing may be performed with the position of the workpiece W being moved with respect to this flow channel to meet the size, the shape and the quantity of the workpieces W. For example, the polishing device 01 may further include a mechanism that moves at least any of the processing member 10, the discharge port 32a and the suction part 41. Moreover, the polishing device 01 may further include a mechanism that vibrates the processing member 10, and with this mechanism, the workpiece W may be polished under its rotation.

Figure 4:
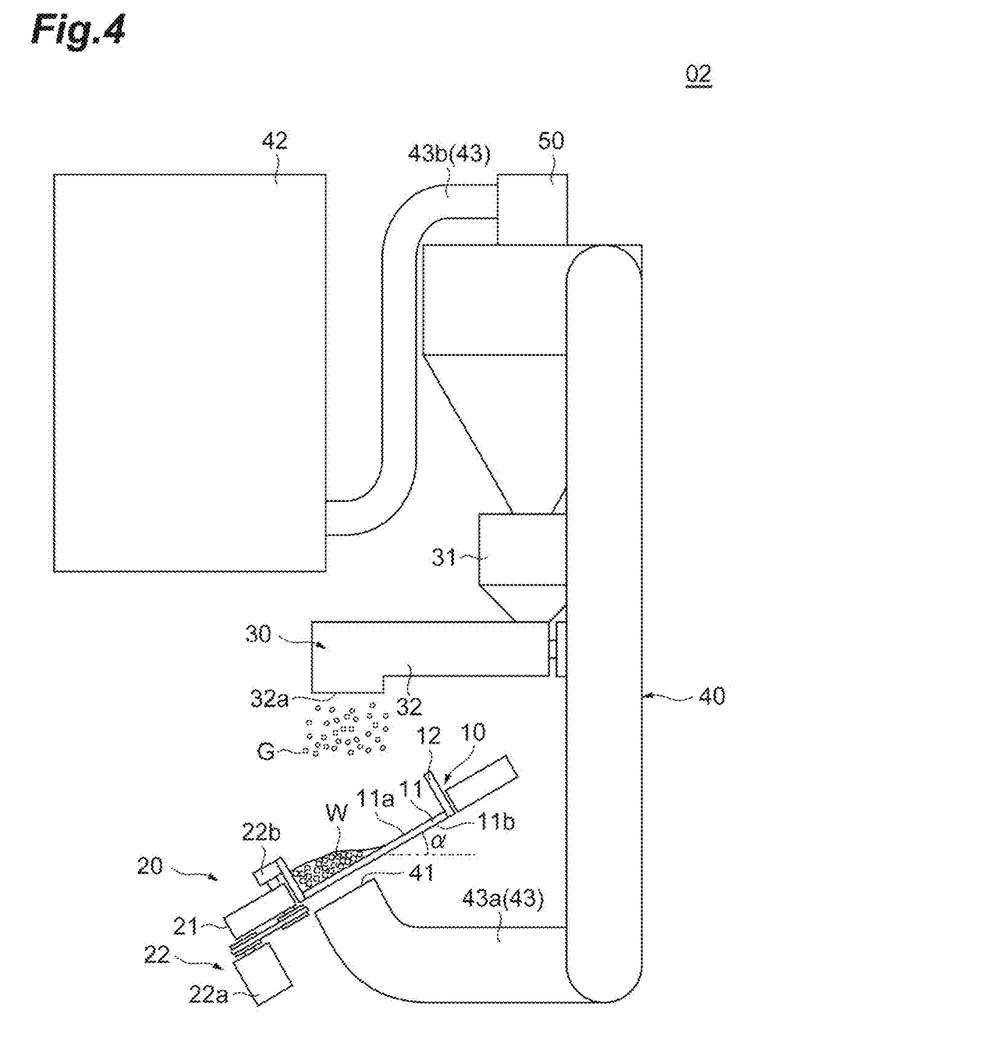
FIG. 4 is a schematic diagram for explaining a polishing device used in a second embodiment of the present invention.

Next, an example of the polishing method in another mode is described as a second embodiment further using FIG. 4. In the following description, differences from the first embodiment are mainly described.

In the second embodiment, when a plurality of workpieces W are polished, all the workpieces W are polished with more uniformity. A polishing device 02 used in the present embodiment includes a stirring mechanism 20 in addition to the configuration of the polishing device 01 used in the first embodiment.

The processing member 10 of the present embodiment has the same configuration as that of the processing member 10 of the first embodiment. When placing a plurality of workpieces W on the first face 11a (that is, containing them in the processing member 10) to stir these workpieces W, the workpieces W do not fall outside the processing member 10 due to the frame body 12.

The stirring mechanism 20 is connected to the processing member 10 and stirs the plurality of workpieces W by setting the plurality of workpieces W contained in the processing member 10 in a fluidized state. The configuration of the stirring mechanism 20 is not specially limited as long as the workpieces W can be stirred. For example, the stirring mechanism 20 may be configured to rotate the processing member 10 or may be configured to vibrate the processing member 10. As the stirring mechanism 20, another known configuration may be used. In the present embodiment, the stirring mechanism 20 rotates the processing member 10 with the center of the plane of the placing board 11 being as an axial center. Specifically, the stirring mechanism 20 includes a retaining member 21 and a rotary mechanism 22. The retaining member 21 rotatably retains the processing member 10 in the state of inclining the processing member 10 at a predetermined inclination angle $\alpha$.

The rotary mechanism 22 is a mechanism that rotates the processing member 10 at a predetermined speed. The rotary mechanism 22 includes a motor 22a that generates rotational force, and a rotational force transmission member 22b that transmits the rotational force of the motor 22a to the processing member 10.

Figure 5:
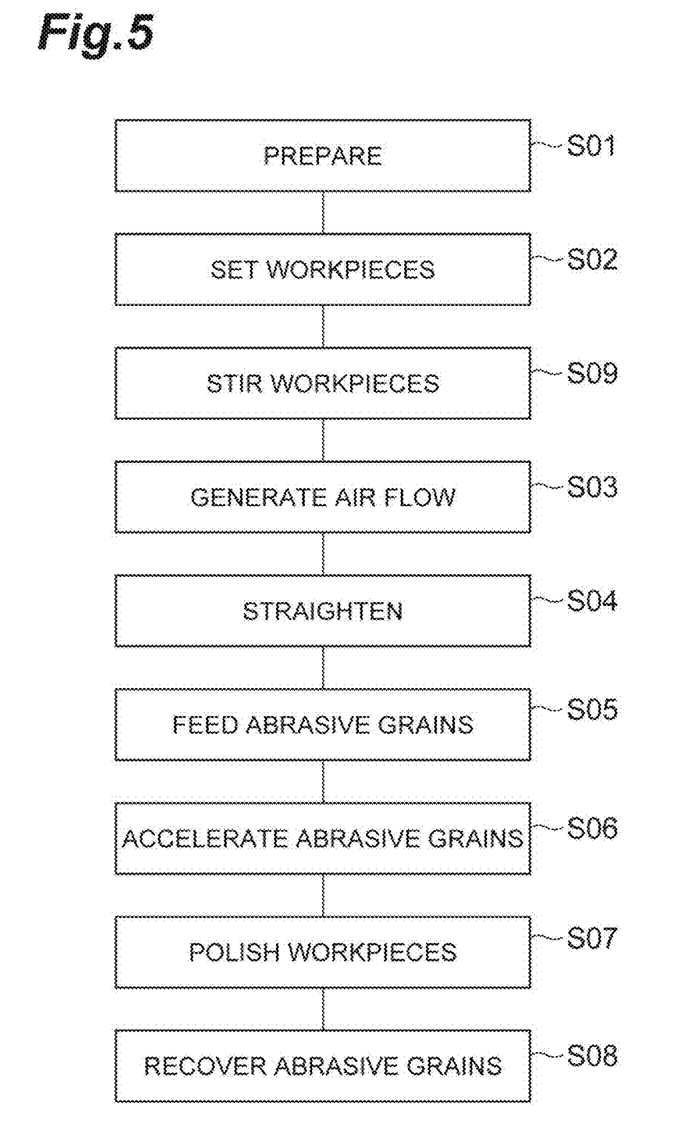
FIG. 5 is a flowchart showing the steps of polishing in the second embodiment.

Next, a polishing method of the second embodiment is described further using FIG. 5. While the polishing method of the second embodiment is almost the same as the aforementioned polishing method of the first embodiment, it is different from the polishing method of the first embodiment in the content of the processing of "S02: Step of Setting Workpiece in Processing Member" and in further including "S9: Step of Stirring Workpieces" performed between step S02 and step S03. These are described below.

(S02: Step of Setting Workpiece in Processing Member)

A plurality of workpieces W are contained (set) in the processing member 10 by placing the plurality of workpieces W on the first face 11a of the placing board 11. The contained amount of the workpieces W is properly selected to meet the property of the workpieces W and the size of the processing member 10 so as to be able to retain the workpieces W with the processing member 10 and to stir the plurality of workpieces W by favorably setting the workpieces W in the fluidized state.

(S09: Step of Stirring Workpieces)

The motor 22a is operated and the processing member 10 is rotated. The workpieces W contained in the processing member 10 move along the frame body 12, following the rotation of the processing member 10. Since the processing member 10 is inclined and retained, centrifugal force in the direction toward the frame body 12 and a component of force of the gravity along the placing board 11 are exerted on the workpieces W. When a workpiece W moves (rises) up to a predetermined position, since the component of force of the gravity becomes larger than the centrifugal force, the workpiece W departs from the frame body 12 and falls downward along the placing board 11. In this way, movements and falls of the workpieces W continuously occur, and thereby, the plurality of workpieces W are brought into the fluidized state. Thus, the plurality of workpieces W are stirred. To achieve this fluidized state, the inclination angle $\alpha$ of the processing member 10 may be 30 to 70° relative to the horizontal plane, or may be 40 to 60°. When the inclination angle $\alpha$ of the processing member 10 is too small, the effect of promoting the fluidization by the gravity is small. When the inclination angle $\alpha$ of the processing member 10 is too large, since the component of force of the gravity becomes too larger than the centrifugal force, it is difficult to move the workpieces W, causing them to follow the rotation of the processing member 10.

Moreover, when the rotational speed of the processing member 10 is too high, since the centrifugal force becomes too strong, it is difficult to cause the workpieces W to fall by the component of force of the gravity. Conversely, when the rotational speed of the processing member 10 is too low, since the centrifugal force becomes too weak, it is difficult to move the workpieces W by the rotation of the processing member 10. In any of these cases, the workpieces W cannot be favorably brought into the fluidized state. To favorably stir the plurality of workpieces W by setting them in the fluidized state, the rotational speed of the processing member 10 may be 5 to 50% of the critical rotational speed or may be 10 to 30% thereof. The critical rotational speed means the speed at the time point when, in the case of increasing the rotational speed of the processing member 10, the centrifugal force exerted on the workpiece W becomes larger than the component of force of the gravity, and the workpieces W do not fall but start to rotate along with the frame body 12.

The steps in and after S03 are performed in the state where the plurality of workpieces W are being stirred by the step of stirring the workpieces (S09) as described above. Namely, since the abrasive grains G collide with or contact with the workpieces W in the fluidized state, the plurality of workpieces W can be polished with uniformity without unevenness.

Next, the results of polishing the workpieces W with these polishing devices are described. Herein, as the workpieces, the following two types of ones were selected and the purpose of processing was set to be debarring of dihedral angle portion.

Workpiece A: The workpiece A was a ceramic molded article obtained by molding a composite material (SiC/$Al_2O_3$) by compressive molding. By adjusting its compression load, the Vickers hardness of the workpiece A was set to be Hv 3 to 200.

Workpiece B: The workpiece B whose base material was zinc-plated iron and the Vickers hardness of the zinc plating was approximately Hv 80.

Workpiece C: The workpiece C was composed of PET resin and the Rockwell hardness (M-scaling) of the workpiece C was approximately 70.

As the devices, the polishing device (device A) of the first embodiment and the polishing device (device B) of the second embodiment were used. Moreover, as a comparative example, a blasting processing device (obtained by modifying an MY-30C drum-type blasting processing device, SINTOKOGIO Ltd.) was used.

As the abrasive grains, abrasive grains composed of alumina (WA #800, SINTOKOGIO Ltd.) were used and polishing was performed by operating the device A and the device B for 30 minutes and the blasting processing device for 30 minutes.

After polished, the processed states of the workpieces were evaluated. The evaluation of the processed states was performed by observing the workpieces to be observed with a microscope (VHX-2000, Keyence Corporation). The workpieces to be observed were the total quantities of workpieces when one workpiece, three workpieces and twenty workpieces were set in the processing members to be processed, and were twenty workpieces sampled from the total quantity of workpieces when one fifth quantity of workpieces relative to the capacity of the processing member were loaded in the processing member to be polished. Evaluation criteria of the processed states were as follows.

◯ . . . Burrs were removed from all the workpieces without damage on the workpieces (cracks or defects of them or sticking of the abrasive grains into them).

Δ . . . There were some workpieces in which burrs slightly remained, but there is no damage on all the workpieces.

X . . . Many burrs were not removed or there were some workpieces that were damaged.

Moreover, the periphery of the processing member was observed after polishing the workpieces by the polishing device of the first embodiment and the polishing device of the second embodiment. The periphery of the drum was observed after polishing the workpieces by the blasting processing device. Then, evaluation of scattering of the abrasive grains was taken as "◯" when adhesion of the abrasive grains was not observed in the periphery of the processing member or in the periphery of the drum, and evaluation of scattering of the abrasive grains was taken as "X" when adhesion of the abrasive grains was observed in the periphery of the processing member or in the periphery of the drum. Likewise, evaluation of scattering of the workpieces was taken as "◯" when workpieces were not observed in the periphery of the processing member or in the periphery of the drum, and evaluation of scattering of the workpieces was taken as "X" when workpieces were observed in the periphery of the processing member or in the periphery of the drum.

Table 1 presents the results of the aforementioned evaluations under individual polishing conditions. Regarding the items for the device in Table 1, the inclination angle denotes an inclination angle (°) of the processing member relative to the horizontal plane in the case of the polishing device of the first embodiment and the polishing device of the second embodiment, and denotes an inclination angle (°) of the drum relative to the horizontal plane in the case of the blasting processing device. Moreover, the rotational speed denotes a ratio (%) relative to the critical rotational speed. Moreover, for the speeds of the abrasive grains, the results obtained by beforehand measuring the particle speeds of the abrasive grains under the individual conditions by a flow speed measurement system (PIV system, Flowtech Research Inc.) are presented.

The content denotes a ratio in volume (vol %) of the abrasive grains in a space of the abrasive grains contributing to polishing on the workpieces. The numerical value of the content presented in Table 1 is the numerical value calculated based on content (vol %)=$\rho \times M/L$ using a suction air capacity L of the dust collector, a mass M of the fed abrasive grains, and a specific gravity $\rho$ of the abrasive grains. Moreover, in the cases of using the blasting processing device in Comparative Examples 2 to 4, the content of the abrasive grains is calculated by replacing the suction air capacity L of the dust collector by the air capacity of compressed air injected from the nozzle, and the mass M of the fed abrasive grains by the mass of the abrasive grains fed to the nozzle.

TABLE 1

| | Polishing Conditions | | | | | |
| --- | --- | --- | --- | --- | --- | --- |
| | Device | | | Workpiece | | |
| | Type | Inclination Angle (°) | Rotational Speed (%) | Type | Size (mm) | Hardness |
| Example 1 | A | 0 | — | A | 20 × 20 × 10 | 50 |
| Example 2 | A | 0 | — | A | 20 × 20 × 10 | 50 |
| Example 3 | A | 0 | — | A | 20 × 20 × 10 | 50 |
| Example 4 | A | 0 | — | A | 20 × 20 × 10 | 50 |
| Example 5 | A | 0 | — | A | 20 × 20 × 10 | 3 |
| Example 6 | A | 0 | — | A | 20 × 20 × 10 | 100 |
| Example 7 | A | 0 | — | A | 20 × 20 × 10 | 200 |
| Example 8 | A | 0 | — | A | 20 × 20 × 10 | 50 |
| Example 9 | A | 0 | — | A | 20 × 20 × 10 | 50 |
| Example 10 | A | 0 | — | A | 20 × 20 × 10 | 50 |
| Example 11 | A | 0 | — | A | 20 × 20 × 10 | 50 |
| Example 12 | A | 0 | — | A | 20 × 20 × 10 | 50 |

TABLE 1-continued

| | | | | | | |
|---|---|---|---|---|---|---|
| Example 13 | A | 0 | — | A | 20 × 20 × 10 | 50 |
| Example 14 | B | 30 | 35 | A | 0.5 × 0.5 × 1.0 | 50 |
| Example 15 | B | 40 | 35 | A | 0.5 × 0.5 × 1.0 | 50 |
| Example 16 | B | 60 | 35 | A | 0.5 × 0.5 × 1.0 | 50 |
| Example 17 | B | 70 | 35 | A | 0.5 × 0.5 × 1.0 | 50 |
| Example 18 | B | 45 | 5 | A | 0.5 × 0.5 × 1.0 | 50 |
| Example 19 | B | 45 | 10 | A | 0.5 × 0.5 × 1.0 | 50 |
| Example 20 | B | 45 | 30 | A | 0.5 × 0.5 × 1.0 | 50 |
| Example 21 | B | 45 | 50 | A | 0.5 × 0.5 × 1.0 | 50 |
| Example 22 | A | 0 | — | B | 20 × 20 × 10 | 80 |
| Example 23 | B | 45 | 25 | B | 0.5 × 0.5 × 1.0 | 80 |
| Example 24 | A | 45 | 25 | C | 0.5 × 0.5 × 1.0 | 70 |
| Example 25 | B | 45 | 25 | C | 0.5 × 0.5 × 1.0 | 70 |
| Comparative Example 1 | A | 0 | — | A | 0.5 × 0.5 × 1.0 | 50 |
| Comparative Example 2 | Blasting | 60 | 20 | A | 0.5 × 0.5 × 1.0 | 50 |
| Comparative Example 3 | Blasting | 60 | 20 | B | 0.5 × 0.5 × 1.0 | 80 |
| Comparative Example 4 | Blasting | 60 | 20 | A | 0.5 × 0.5 × 1.0 | 50 |

| | Polishing Conditions | | | Results | | |
|---|---|---|---|---|---|---|
| | | Abrasive Grains | | | Scattering of | |
| | Workpiece Quantity | Speed (m/sec) | Content (vol %) | Processed State | Abrasive Grains | Scattering of Workpieces |
| Example 1 | 1 | 5 | 10 | Δ | ○ | ○ |
| Example 2 | 1 | 10 | 10 | ○ | ○ | ○ |
| Example 3 | 1 | 20 | 10 | ○ | ○ | ○ |
| Example 4 | 1 | 30 | 10 | Δ | ○ | ○ |
| Example 5 | 1 | 15 | 10 | ○ | ○ | ○ |
| Example 6 | 1 | 15 | 10 | ○ | ○ | ○ |
| Example 7 | 1 | 15 | 10 | Δ | ○ | ○ |
| Example 8 | 1 | 15 | 3 | Δ | ○ | ○ |
| Example 9 | 1 | 15 | 8 | ○ | ○ | ○ |
| Example 10 | 1 | 15 | 15 | ○ | ○ | ○ |
| Example 11 | 1 | 15 | 20 | Δ | ○ | ○ |
| Example 12 | 3 | 15 | 10 | ○ | ○ | ○ |
| Example 13 | 20 | 15 | 10 | Δ | ○ | ○ |
| Example 14 | ⅓ of Capacity | 15 | 10 | Δ | ○ | ○ |
| Example 15 | ⅓ of Capacity | 15 | 10 | ○ | ○ | ○ |
| Example 16 | ⅓ of Capacity | 15 | 10 | ○ | ○ | ○ |
| Example 17 | ⅓ of Capacity | 15 | 10 | Δ | ○ | ○ |
| Example 18 | ⅓ of Capacity | 15 | 10 | Δ | ○ | ○ |
| Example 19 | ⅓ of Capacity | 15 | 10 | ○ | ○ | ○ |
| Example 20 | ⅓ of Capacity | 15 | 10 | ○ | ○ | ○ |
| Example 21 | ⅓ of Capacity | 15 | 10 | Δ | ○ | ○ |
| Example 22 | 1 | 15 | 10 | ○ | ○ | ○ |
| Example 23 | ⅓ of Capacity | 15 | 10 | ○ | ○ | ○ |
| Example 24 | 1 | 15 | 10 | ○ | ○ | ○ |
| Example 25 | ⅓ of Capacity | 15 | 10 | ○ | ○ | ○ |
| Comparative Example 1 | ⅓ of Capacity | 15 | 10 | X | ○ | ○ |
| Comparative Example 2 | ⅓ of Capacity | 120 | 60 | X | X | X |
| Comparative Example 3 | ⅓ of Capacity | 120 | 60 | X | X | X |
| Comparative Example 4 | ⅓ of Capacity | 15 | Unable to Calculate | X | ○ | ○ |

When polishing the workpieces by the polishing device of the first embodiment, all the evaluations of the processed states were "○" or "Δ" regardless of the type of the workpieces (Examples 1 to 13, 22 and 24). Since in the examples for which the evaluations of the processed states were "Δ", burrs slightly remained in the workpieces without damage on the workpieces, it is indicated that the evaluations of the processed states can become "○" by further elongating the polishing time.

Moreover, also when the hardness of the workpieces is changed to Hv 3 to 200, the workpieces were favorably polished (Examples 5 to 7).

Moreover, while also when polishing the plurality of workpieces, the workpieces were favorably polished (Examples 12 and 13), in the case of an excess quantity of the workpieces with respect to the flow of the abrasive grains, burrs were not removed for many workpieces (Comparative Example 1). When the plurality of workpieces, therefore, were being stirred and polished by fluidizing the plurality of workpieces with the polishing device of the second embodiment, the evaluations of the processed states of all the workpieces were "○" or "Δ" regardless of the type, size, hardness and quantity of the workpieces (Examples 14 to 21, 23 and 25). Herein, for the examples in which the evaluations of the processed states were "Δ", it is indicated that the evaluations of the processed states can become "○" by further elongating the polishing time for the same reason as above.

Moreover, in Examples 1 to 25 and Comparative Example 1, as the results of observing the periphery of the processing member after polishing, neither adhesion of the abrasive grains nor fall of workpieces in the periphery of the processing member was not observed. As above, it is found that the polishing devices of the first embodiment and the second embodiment can polish the workpieces without scattering the abrasive grains to the periphery or shaking off the workpieces.

On the other hand, when the workpieces were polished by the blasting processing device, while burrs of the workpieces were removed, damage on the workpieces arose and the evaluations of the processed states were "X" (Comparative Examples 2 and 3). Moreover, when observing the periphery of the drum, that is, the inside of the processing chamber after polishing, adhesion of the abrasive grains on the wall surface of the blasting processing chamber was observed, and the evaluations of scattering of the abrasive grains were "X". Furthermore, examining the classifying mechanism joined to the blasting processing device revealed the presence of workpieces. This indicates that the workpieces are shaken off from the drum during polishing.

Moreover, in the case where when polishing the workpieces by the blasting processing device, the injection pressure was set to be an exceedingly low pressure to set the speed of the blasting abrasives to be 15 m/sec, while both of the evaluations of scattering of the abrasive grains and scattering of the workpieces were "○", the evaluation of the processed state was "X" (Comparative Example 4). This is because the injection amount of the blasting abrasives from the nozzle was not stabilized and the injection amount pulsates to inject the blasting abrasives, and as a result, unevenness arose on the degree of finishing of the workpieces and burrs were not removed for many workpieces. Notably, since the injection amount of the blasting abrasives from the nozzle was not stabilized, the content could not be calculated.

INDUSTRIAL APPLICABILITY

With the aforementioned embodiments, a novel polishing method can be provided. In this polishing method, the abrasive grains are accelerated to a predetermined speed with suction force to give the abrasive grains kinetic energy suitable for polishing, and by the abrasive grains which have this kinetic energy colliding with or contacting with the workpiece, the workpiece is polished. Then, the total amount of the abrasive grains and fine particles is recovered by the suction member. Thus, the following effects are obtained.

(1) The abrasive grains do not scatter to the periphery.
(2) The workpiece is not shaken off outside the processing container during polishing.
(3) Since the speed of the blasting abrasives in polishing is approximately 10 to 30 m/sec and the workpiece can be polished with the blasting abrasives at an exceedingly low speed, also the workpiece relatively low in hardness can be favorably polished. For example, metal materials such as copper, aluminum and tin, molded articles of ceramic and magnetic materials before burning, resin molded articles, and the like can be favorably polished.

REFERENCE SIGNS LIST

01 Polishing device (first embodiment)
02 Polishing device (second embodiment)
10 Processing member
11 Placing board
11a First face
11b Second face
12 Frame body
20 Stirring mechanism
21 Retaining member
22 Rotary mechanism
22a Motor
22b Rotational force transmission member
30 Abrasive grain feed mechanism
31 Reservoir tank
32 Carrying-out part
32a Discharge port
40 Suction mechanism
41 Suction part
42 Dust collector
43 Hose
43a First hose
43b Second hose
50 Sorting mechanism
A Acceleration region
P Polishing region
F (F1, F2, F3) Action of the abrasive grains
G Abrasive grains
W Workpiece

The invention claimed is:

1. A polishing method comprising:
a step of preparing a polishing device including a processing member, an abrasive grain feed mechanism, and a suction mechanism configured to generate suction force;
a step of setting a workpiece in the processing member;
a step of feeding abrasive grains toward the workpiece by the abrasive grain feed mechanism through free fall at a free fall speed;
a step of accelerating the abrasive grains fed toward the workpiece from the free fall speed to a predetermined speed with an air flow generated by operation of the suction mechanism, and polishing the workpiece by causing the abrasive grains to contact with or collide with the workpiece; and
a step of recovering the abrasive grains by the suction mechanism.

2. The polishing method according to claim 1, wherein
the processing member includes a placing board having a first face and a second face as a reverse face to the first face,
a plurality of through holes penetrating the placing board in a direction from the first face toward the second face are provided in the placing board,
each of the plurality of through holes has a dimension such that each of the abrasive grains is capable of passing through and the workpiece is incapable of passing through, and
in the step of setting the workpiece in the processing member, the workpiece is placed on the first face.

3. The polishing method according to claim 2, further comprising
a step of straightening the air flow by the suction mechanism, wherein
in the step of straightening, by straightening the air flow, a mode of the abrasive grains contacting with or colliding with the workpiece is controlled.

4. The polishing method according to claim 2, wherein
the suction mechanism is disposed on the second face side, and
the air flow is an air flow from the first face toward the second face.

5. The polishing method according to claim 4, wherein
the processing member further includes a frame body provided at an outer edge part of the placing board.

6. The polishing method according to claim 4, further comprising
a step of straightening the air flow by the suction mechanism, wherein
in the step of straightening, by straightening the air flow, a mode of the abrasive grains contacting with or colliding with the workpiece is controlled.

7. The polishing method according to claim 4, wherein
in the step of polishing the workpiece, the abrasive grains are fed from the first face side toward the workpiece, and
in the step of recovering, the abrasive grains having reached the second face are sucked and recovered by the suction mechanism.

8. The polishing method according to claim 2, wherein
in the step of polishing the workpiece, the abrasive grains are fed from the first face side toward the workpiece, and
in the step of recovering, the abrasive grains having reached the second face are sucked and recovered by the suction mechanism.

9. The polishing method according to claim 8, further comprising
a step of straightening the air flow by the suction mechanism, wherein
in the step of straightening, by straightening the air flow, a mode of the abrasive grains contacting with or colliding with the workpiece is controlled.

10. The polishing method according to claim 8, wherein the processing member further includes a frame body provided at an outer edge part of the placing board.

11. The polishing method according to claim 2, wherein the processing member further includes a frame body provided at an outer edge part of the placing board.

12. The polishing method according to claim 11, further comprising
a step of stirring a plurality of the workpieces by setting the plurality of workpieces in a fluidized state, wherein
in the step of setting the workpiece, the plurality of workpieces are placed on the first face, and
in the step of polishing the workpiece, the plurality of workpieces are polished by causing the abrasive grains to contact with or collide with the plurality of workpieces in the fluidized state.

13. The polishing method according to claim 12, wherein in the step of stirring the plurality of workpieces, the plurality of workpieces are stirred by disposing the processing member with an inclination at a predetermined angle and rotating the processing member.

14. The polishing method according to claim 13, wherein the predetermined angle is 30 to 700.

15. The polishing method according to claim 13, wherein a rotational speed of the processing member is 5 to 50% of a critical rotational speed.

16. The polishing method according to claim 1, further comprising
a step of straightening the air flow by the suction mechanism, wherein
in the step of straightening, by straightening the air flow, a mode of the abrasive grains contacting with or colliding with the workpiece is controlled.

17. The polishing method according to claim 1, wherein
a Vickers hardness of the workpiece is 3 to 200 Hv, and
a speed of the abrasive grains in the occasion when the abrasive grains contact with or collide with the workpiece is 5 to 30 m/sec.

18. The polishing method according to claim 17, wherein a ratio of the abrasive grains occupying a space of the abrasive grains contributing to polishing on the workpiece is 3 to 20 vol %.

19. A polishing device for polishing a workpiece, comprising:
a processing member for placing the workpiece;
an abrasive grain feed mechanism configured to feed abrasive grains toward the workpiece placed on the processing member through free fall at a free fall speed; and
a suction mechanism configured to generate an air flow in a direction from the abrasive grain feed mechanism toward the processing member with suction force and configured to recover the abrasive grains with the suction force, wherein
the suction mechanism accelerates the abrasive grains fed toward the workpiece by the abrasive grain feed mechanism from the free fall speed to a predetermined speed with the air flow, and polishes the workpiece by causing the accelerated abrasive grains to contact with or collide with the workpiece, and
the suction mechanism recovers the abrasive grains after the abrasive grains contact with or collide with the workpiece.

* * * * *